United States Patent [19]
Yokota et al.

[11] Patent Number: 5,851,470
[45] Date of Patent: *Dec. 22, 1998

[54] METHOD OF PRODUCING A PLATE-LIKE MATERIAL WITH A RESINOUS MEMBER FOR A WINDOW

[75] Inventors: Seiichi Yokota; Hideyuki Hashimoto; Kazuhiko Takahashi, all of Aichi-ken, Japan

[73] Assignee: Asahi Glass Company Ltd., Tokyo, Japan

[*] Notice: The term of this patent shall not extend beyond the expiration date of Pat. No. 5,676,898.

[21] Appl. No.: 878,077

[22] Filed: Jun. 18, 1997

Related U.S. Application Data

[63] Continuation of Ser. No. 409,100, Mar. 23, 1995, Pat. No. 5,676,898.

[30] Foreign Application Priority Data

Mar. 23, 1994 [JP] Japan ................................ 6-051974
Jul. 29, 1994 [JP] Japan ................................ 6-178888

[51] Int. Cl.⁶ .................................................. B29C 45/14
[52] U.S. Cl. ............................ 264/219; 264/263; 264/275
[58] Field of Search ............................ 264/219, 263, 264/250, 255, 251, 254, 261, 275; 425/116, 129.1

[56] References Cited

U.S. PATENT DOCUMENTS

| | | | |
|---|---|---|---|
| 4,495,740 | 1/1985 | Sarrazin et al. ........................ | 264/255 |
| 4,561,625 | 12/1985 | Weaver ................................... | 425/116 |
| 4,839,122 | 6/1989 | Weaver ................................... | 264/275 |
| 4,861,540 | 8/1989 | Nieboer et al. ......................... | 264/263 |

FOREIGN PATENT DOCUMENTS

| | | |
|---|---|---|
| 0 468 713 | 1/1992 | European Pat. Off. . |
| 2524377 | 10/1983 | France . |
| 1584961 | 2/1981 | United Kingdom . |
| 2093754 | 9/1982 | United Kingdom . |

OTHER PUBLICATIONS

Patent Abstracts of Japan, vol. 10, No. 324 (M–536)(2398), Nov. 19, 1986, JP–61–143240, Jun. 30, 1986.
Patent Abstracts of Japan, vol. 9, No. 87 (M–372) (1810), Apr. 17, 1985, JP–59–215817, Dec. 5, 1984.

*Primary Examiner*—Angela Ortiz
*Attorney, Agent, or Firm*—Oblon, Spivak, McClelland, Maier & Neustadt, P.C.

[57] ABSTRACT

A method of forming a seat for a fixture for attaching a window to a vehicle in one piece by forming a cavity between a shaping mold and the window and injecting a resinous material for forming the seat into the cavity, wherein a recess is formed at a side surface of the resin molding die; a window is placed on the mold so as to arrange the recess at a position corresponding to an inner peripheral region which is apart by a predetermined distance from the edge of the window thereby forming the cavity in association with the recess and the surface of the window; and the resinous material is injected into the cavity, followed by curing the resinous material, whereby the seat is formed in one piece on the window at the position inside by a predetermined distance from the edge of the window.

4 Claims, 8 Drawing Sheets

METHOD OF PRODUCING A PLATE-LIKE MATERIAL WITH A RESINOUS MEMBER FOR A WINDOW

This is a Continuation of application Ser. No. 08/409,100 filed on Mar. 23, 1995, now U.S. Pat. No. 5,676,898.

BACKGROUND OF THE INVENTION

1. Field of the Invention

The present invention relates to a method of producing a plate-like material for a window, which has a resinous member such as a seat for a fixing member which is used when a plate-like material for a window used for buildings, vehicles and so on is attached to a flange fitted to a window opening (hereinbelow, referred to simply as a flange), a seat used for attaching a mirror base for vehicles, a packing made of a resin to be attached to the periphery of an opening to which a wiper for a vehicle window is fitted, or the like.

2. Discussion of the Background

The plate-like material for a window (hereinbelow, referred to simply as a plate-like material) is fitted to a flange by interposing sealant such as urethane between the flange and the plate-like material. There is another method of attaching the plate-like material to a flange for a window opening by fitting a clip, a stud bolt or the like to the plate-like material, and inserting the clip or the like to an opening formed in a predetermined position of the flange. In the former case, an additional clip or provisionally fixing the plate-like material to the flange until the plate-like material is firmly attached to the flange by means of the sealant, or an additional clip for positioning the plate-like material at a predetermined position in the flange, is sometimes used for the plate-like material. In the later case, a waterproof sealant such as a butyl sealant is used between the flange and the plate-like material to assure watertightness for the window. An urethane sealant itself has watertightness.

The member such as the stud bolt, the clip or the like (hereinbelow referred to as a fixing member in a general term, irrespective of whether it is used either for provisionally fixing or permanently fixing) used for attaching the plate-like material to the flange may be directly attached to the plate-like material as described above, or may be attached to a frame of synthetic resin which is formed integrally with a peripheral portion of the plate-like material, whereby the plate-like material is attached to the flange by utilizing the frame.

The attachment of the fixing member to the plate-like material or the frame can be done by interposing a sealant of urethane or the like or a double-coated tape between the fixing member and the plate-like material (or the frame) at a predetermined position.

Generally, the fixing member is attached to the plate-like material so as to extend in the direction of normal line to the surface of the plate-like material. Accordingly, the orientation of the fixing member is apt to deflect depending on a curved portion in the plate-like material. In order to increase the accuracy of the orientation of the fixing member, the radius of curvature of the curved portion of the plate-like material has to be strictly controlled. Further, a jig and tools for inclusive use have to be prepared in order to attach the fixing member. Further, in a special case, when the orientation of the fixing member is to be changed desirably, it must be contriving the shape of the fixing member itself. In particular, when a plurality of fixing members are used, different shapes are needed for the fixing members corresponding to the number of use.

In a case of using the urethane sealant for fixing the fixing member to the plate-like material, it takes a certain time until the urethane sealant is cured. Accordingly, a space for keeping the plate-like material fixed fixing member with the urethane sealant is necessary.

On the other hand, when the fixing member is attached to the frame, the fixing member is usually positioned at the interior side of the frame. However, when a sealant having watertightness is additionally used between the plate-like material and the flange, the fixing member is positioned at the outer side of the sealant. Accordingly, it reduces reliability on the watertightness, and an element for preventing a leak of water, such as a packing is required to assure watertightness. For this, it is considered to increase the width of the frame toward the inner side of the plate-like material; to position the fixing member at a position inside the watertight sealant, and to apply the sealant between the frame and the flange. However, such method increases the thickness of a window to be formed because of the thickness of the sealant. Further, a large amount of material is necessary for the flange since the width of the frame is increased toward the inside of the plate-like material.

In order to eliminate the above-disadvantage, there has been proposed to form an extension, as a seat, in the frame so as to extend to the inner side, at only portion where the fixing member is positioned, in order to eliminate an increase in an amount of material for the frame when the fixing member is positioned at the inner side of the watertight sealant. In order to form the frame on a peripheral portion of the plate-like material in one piece, the peripheral portion of the plate-like material is interposed in shaping mold dies for resin molding, and resin is injected into a cavity formed in the mold. The above-mentioned seat can be formed integrally with the plate-like material by forming a bridge-like introduction passage for resinous material in the mold. The fixing member is attached to the seat.

However, the portion formed by the bridge-like introduction passage for resin material occupies only a portion in an area which is at a certain distance from the edge of the plate-like material. Accordingly, it is not avoidable to produce a step portion between a portion having the extension toward the inner side and the portion without the extension. The step portion produces a gap when the plate-like material is attached to the flange, whereby a sufficient watertightness cannot be obtained. Further, it is necessary to use a primer for the bridge-like portion which is a portion of the flange and the plate-like material before the watertight sealant is used.

The seat for the fixing member can be formed on the plate-like material by removing the bridge-like portion after the molding. Then, the watertight sealant is applied on the surface of the outer side of the seat of the plate-like material. The removal of the bridge-like portion requires complicated steps by which the plate-like material may be damaged.

SUMMARY OF THE INVENTION

It is an object of the present invention to eliminate the disadvantages in the conventional technique.

In accordance with the present invention, there is provided a method of forming a resinous member on a plate-like material for a window in one piece by forming a cavity between a shaping mold and the plate-like material and injecting a resinous material for forming the resinous member into the cavity, the method being characterized by forming a recess at a side surface of the shaping mold; putting the plate-like material with a surface in contact with the side surface so as to arrange the recess at a position corresponding to an inner peripheral region which is apart by a predetermined distance from the edge of the plate-like material thereby forming the cavity in association with the recess and the surface of the plate-like material; injecting the resinous material into the cavity, and curing the resinous material, whereby the resinous material is formed in one piece on the plate-like material at the position inside by the predetermined distance from the edge of the plate-like material.

By the above-mentioned method, it is possible to form in one piece a resinous member such as a seat for the fixing member, a seat for a mirror base for vehicles, a packing for a wiper for vehicles or the like, at a desired position apart by a predetermined distance and inward from the edge of the plate-like material in accordance with the purpose of use. In particular, the position of the resinous member can be precisely controlled by using a robot.

When the seat for the fixing member is formed, a water-tight sealant which is used when the plate-like material is attached to the flange can be applied at an outer portion with respect to the seat, whereby an increase in the number of elements and an additional working step can be eliminated.

When the frame is formed integrally with a peripheral portion of the plate-like material, a step of removing a bridge-like portion of resin which is required in the conventional method, can be eliminated. Further, the elimination of the removing step can reduce a possibility of damaging the plate-like material.

Generally, a small projection is produced in a molded product at a position corresponding to the outlet of a resin passage because there is an excessive amount of resin material injected, which is solidified after the curing of it. If the small projection is left at the top surface of the seat, namely, it is in the same level of the upper surface of the seat on which the fixing member is to be fixed, a close contact of the plate-like material to the flange cannot be obtained. In order to remove the small projection, a complicated process is required. In the present invention, the resinous material is injected in the cavity, by which the seat has a step portion when molded, from a portion corresponding to a lower step portion of the seat, whereby a tearing process for the small projection formed on the seat becomes unnecessary.

Further, since there is no restriction to the positioning of the fixing member to the shaping mold, the orientation of the fixing member is free from the direction of the normal line of the plate-like material. Accordingly, the fixing member can be directed to a desired direction depending on a design of the flange and/or the plate-like material. The fixing members can be attached to the plate-like material at desired positions and in desired numbers in accordance with the purpose of fixing such as provisional fixing or permanently fixing and the size of the plate-like material. Accordingly, there is obtainable a method of producing a plate-like material with a fixing member whereby the degree of freedom in designing of the product is increased.

BRIEF DESCRIPTION OF THE DRAWING

In the drawings:

FIG. 9b is a perspective view showing an embodiment of the plate-like material obtained by the method shown in FIG. 9a;

DESCRIPTION OF THE PREFERRED EMBODIMENTS

Preferred embodiments of the present invention will be described with reference to the drawings wherein the same reference numerals designate the same or corresponding parts.

Figure 1:
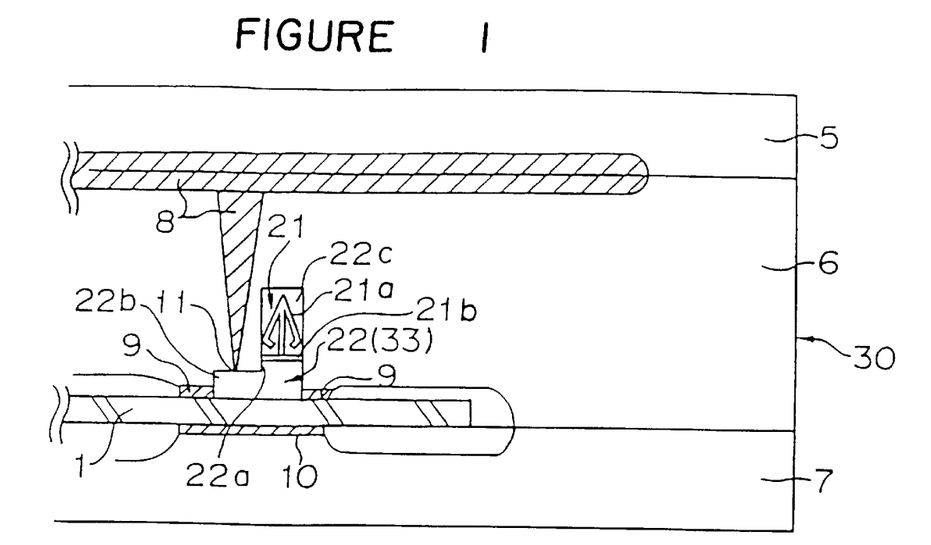
FIG. 1 is a schematic view in cross section showing an embodiment of the method of producing the plate-like material with a resinous member according to the present invention.

FIG. 1 is a schematic view in cross section showing an embodiment of the method of attaching a resinous member as a seat for a fixing member to a plate-like material.

In FIG. 1, a shaping mold 30 comprises an upper mold 5, an intermediate mold 6 and a lower mold 7. A resin passage 8 comprising a sprue, a runner and a gate is formed between the upper mold 5 and the intermediate mold 6. A recess 22 is formed in the lower surface of the intermediate mold 6. The recess 22 forms a cavity 33 in association with a surface of the plate-like material 1 when a peripheral portion of the plate-like material 1 is interposed between the intermediate mold 6 and the lower mold 7. In this case, it is preferable to provide a cushion means or packing of a material such as rubber, spring or the like which is adapted to resiliently hold the plate-like material 1 at a position of the lower mold 7 in contact with the plate-like material 1. It is further preferable to provide an adjusting means 9 of a material such as rubber, spring or the like for absorbing an error in the radius of curvature of the plate-like material 1, at a position of the intermediate mold 6 in contact with the plate-like material 1.

The recess 22 has a step portion in a longitudinal cross section, namely, it has a deep portion (a large recess portion) 22a and a shallow portion (a small recess portion) 22b. An outlet of resin passage 11 faces the shallow portion 22b. Resinous material is injected in the cavity 33 from the outlet 11 through a resin providing member and the resin passage 8. The fixing member is placed in the deep portion 22a of the recess 22.

A fixing member 21 preferably has an upper portion in a substantially conical shape or a triangular shape in cross section as a main body for fixing 21a and a bottom portion 21b in a flat plate-like portion. Thus, the flat plate-like portion functions as a cover for defining the upper face of the cavity 33 whereby the invasion of resinous material to an upper portion 22c of the recess 22 where the fixing member 21 is placed, can be prevented. Since the fixing member 21 has the upper portion in a substantially conical shape or a triangular shape in cross section, the mounting of the fixing member 21 in the recess 22 can be secured without a risk of coming-off.

Figure 2:
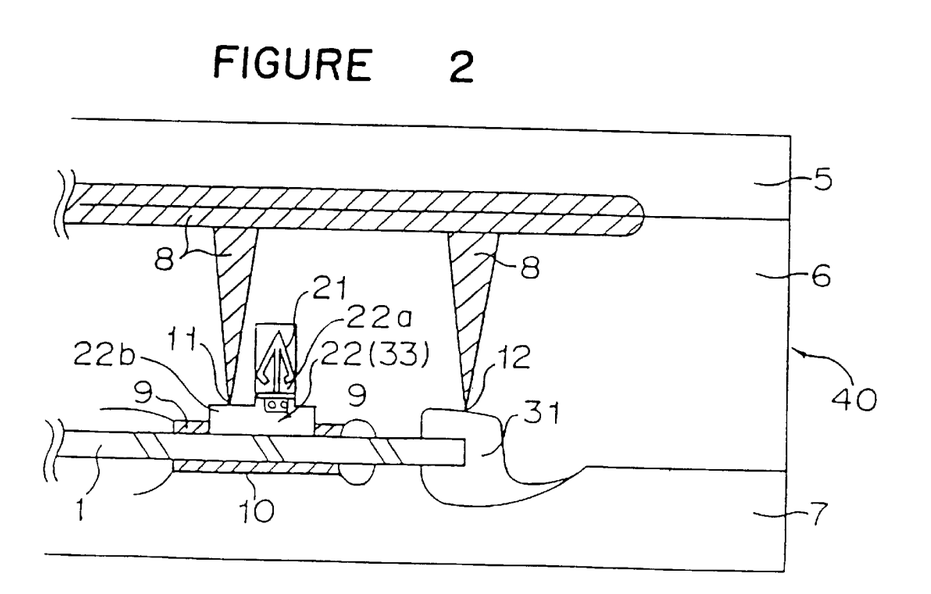
FIG. 2 is a schematic view in cross section showing another embodiment of the method of producing a plate-like material with a resinous member according to the present invention.

The fixing member 21 may not have function as a cover, and may have function for preventing the flowing of the resinous material to a portion where the fixing member is mounted. It is possible to prevent the flowing of the resinous material with various kinds of means. The main body portion 21a may have a shape which gradually spreads from the top to the bottom portion so as to function as a leaf spring, whereby the coming-off of the fixing member can be prevented, and a shift of the fixing member 21 due to a pressure of the resinous material can be prevented. Further, a plurality of openings may be formed in the bottom portion 21b so that the resinous material flows into the openings and solidifies as shown in FIG. 2. Accordingly, the fixing member 21 can further be secured to the seat.

Figure 5:
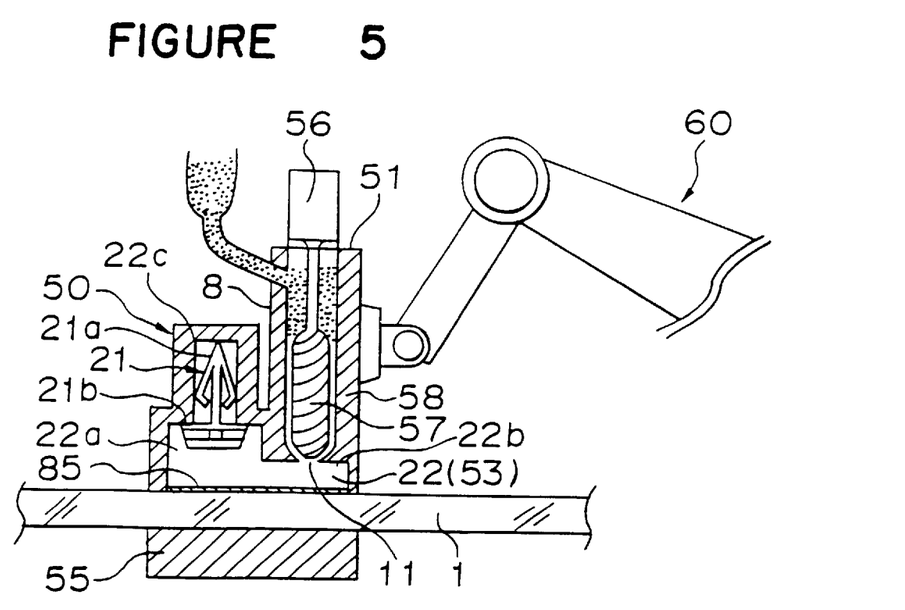
FIG. 5 is a schematic view in cross section showing a step of the method of producing a plate-like material with a resinous member according to the present invention.
Figure 6:
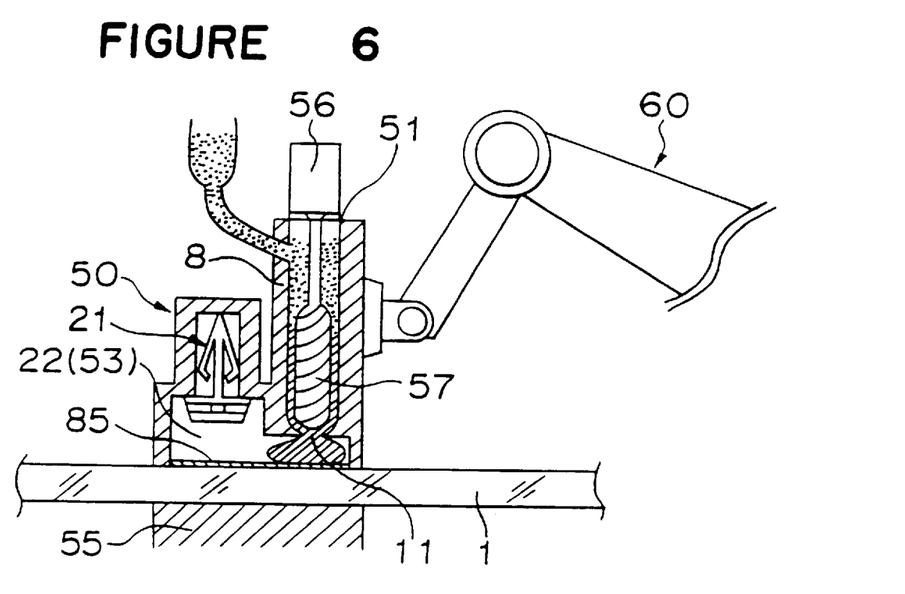
FIG. 6 is a schematic view in cross section showing another step of the method of producing the plate-like material with a resinous member according to the present invention.
Figure 7:
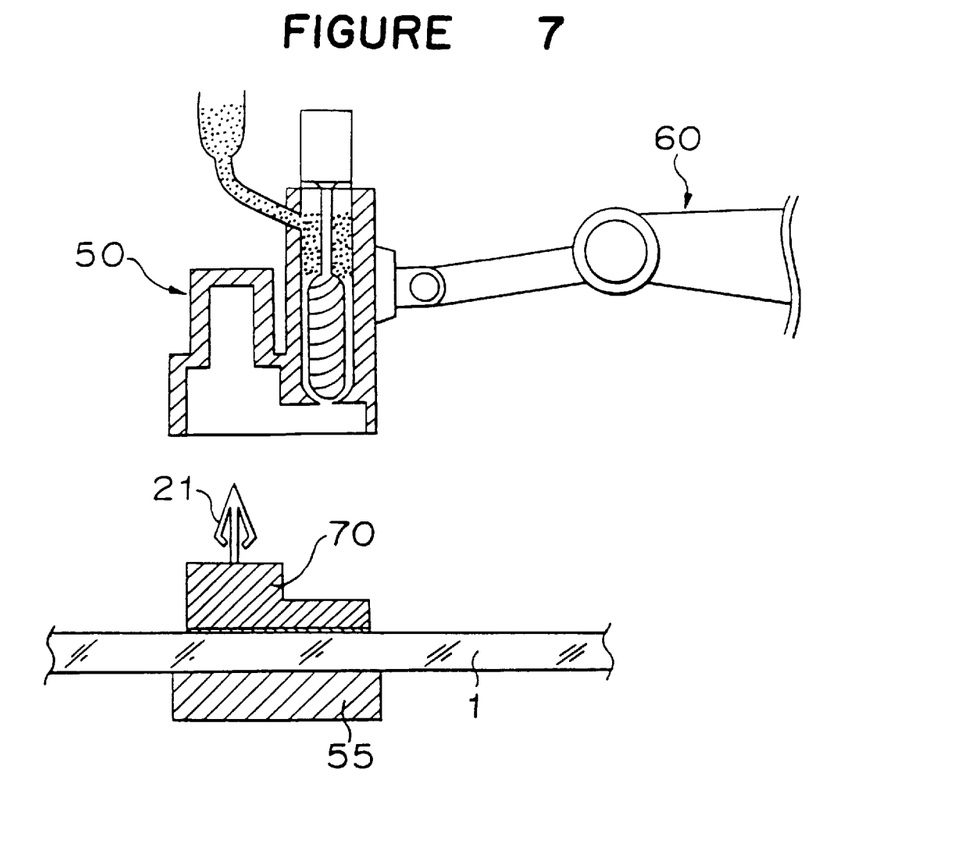
FIG. 7 is a schematic view in cross section showing a still another step of the method of producing the plate-like material with a resinous member according to the present invention.

Thus, the fixing member 21 is positioned in the deep portion 22a of the recess 22; the plate-like material 1 is interposed between the intermediate mold 6 and the lower mold 7; the resinous material is injected into the cavity 33; the resinous material is cured, and then, the plate-like material is removed from the dies, whereby the seat and the fixing member 21 can be formed integrally with the plate-like material 1. However, the plate-like material 1 is not always interposed between the intermediate mold 6 and the lower mold 7. For instance, the plate-like material 1 may be mounted on a back-up member (v. FIGS. 5–7), followed by fitting a mold having the same shape as the intermediate mold.

The shape of the recess 33 formed in the resin molding die can be determined as desired depending on the shape of the fixing member 21 and the shape of the flange. Accordingly, it is not always necessary that the recess 33 have a substantially stepped portion in a longitudinal cross section as described above. However, it is desirable to form a deep portion and a shallow portion in the recess so that the seat to be produced has a higher portion and a lower portion since it is unnecessary to conduct post-finishing for the seat formed.

The reason why the post-finishing is unnecessary is as follows. Generally, a small projection is produced in a molded product at a position corresponding to the outlet of resin passage because an excessive amount of resinous material injected is left at that position. When the small projection is produced on the top surface of the seat, namely, it is in the same level as a position where the fixing member is attached, the close contact of the plate-like material to the flange cannot be obtained. The removal of the small projection requires an additional complicated step. If the small projection is formed at a position lower than the top surface of the seat to which the fixing member is attached, the post-finishing is unnecessary. Accordingly, it is desirable to form the deep portion and the shallow portion in the recess; to position the fixing member in the deep portion, and to inject the resinous material from the shallow portion through the outlet of resin passage. The post-finishing can be eliminated by forming the outlet of resin passage at a side face of the recess. However, it is preferable to provide the outlet of resin passage in the shallow portion from the standpoint of the fluidity of resin.

The plate-like material obtained by the method of the present invention can be used for a front window, a side window, a rear window, a roof window or the like in vehicles or a window for buildings. The plate-like material may have a flat shape or a curved shape depending on the purpose of use. As material for the plate-like material, there are a glass plate such as a single plate glass, a layered glass, a laminated glass wherein a glass plate and a film of synthetic resin are bonded, a transparent organic resin plate, and a plate wherein a plurality of glass plates and resinous plates are laminated.

In order to improve the bonding property between the plate-like material and the resinous member, it is desirable to apply a primer treatment with use of an adhesive such as a urethane type, an acryl type, a nylon type, a phenol type, a polyester type, a silane type or the like at a position of the plate-like material at which the resinous member is formed. Further, it is preferable to apply a suitable adhesive to the fixing member in order to increase the bonding characteristic between the fixing member and the resinous member as the seat. On the other hand, as described before, when a plurality of openings are formed in the bottom portion 21b, the application of the adhesive to the fixing member can be omitted. It is because the fixing member can be formed integrally with the seat by the solidification of the resinous material under the condition that the material enters in the openings.

As material for the resinous member in the present invention, there are, for instance, a compound softened by adding an additive such as plasticizer to a mixture, as a base resin comprising at least one in a group of polyvinyl chloride, a copolymer of vinyl chloride and ethylene, a copolymer of vinyl chloride and vinyl acetate, a copolymer of vinyl chloride and propylene and a copolymer of vinyl chloride, ethylene and vinyl acetate. Further, another thermoplastic resin may be blended to increase the fluidity. As the thermoplastic resin to be blended, there is a chlorinated polyethylene resin, a urethane-modified vinyl chloride resin, a urethane resin, a polyester resin, a acrylic resin, rubber including polyester elastomer, NBR or SBR, EVA or ABS. Such thermoplastic resins may be used alone or in combination as a mixture of two or more of them.

The material is introduced into the cavity by an ordinary injection molding method to obtain a molded product. Further, a reactive injection molding method may be employed with the use of a reactive urethane resin. Further, a thermoset resin may be used. However, it is preferable to use the above-mentioned thermoplastic resin because it is possible to employ a hot runner system for reducing an amount of resin in the resin passage and to use the material again.

A frame of synthetic resin may be formed integrally with the plate-like material at its peripheral portion, the frame being interposed between the flange and the plate-like material. When the frame is formed with the same material as the seat, a second cavity is formed at an outer position in the plate-like material with respect to the recess of the shaping mold, whereby the frame can be formed integrally with the plate-like material at the same time of forming the seat by injecting the resinous material into the second cavity at the same time of injecting the resinous material into the first cavity which is formed in association with the recess and the plate-like material.

FIG. 2 shows the above-mentioned embodiment. A resin molding die 40 comprising an upper mold 5, an intermediate mold 6 and lower mold 7 wherein a resin passage 8 having a sprue, a runner and a gate is formed between the upper mold 5 and the intermediate mold 6. A recess 22 is formed in the lower surface of the intermediate mold 6 so that a cavity 33 is formed in association with the recess 22 and a surface of the plate-like material 1 when a peripheral portion of the plate-like material 1 which is a curved single-layered glass plate is interposed between the intermediate mold 6 and the lower mold 7. Further, a second cavity 31 is formed at a position corresponding to an outer peripheral portion of the recess 22. The cavity 31 is defined in association with the inner wall of the intermediate mold 6, the inner wall of the lower mold 7 and the peripheral portion of the plate-like material 1 in correspondence to the outer periphery of the plate-like material 1.

In the same manner as the embodiment shown in FIG. 1, the recess 22 has a substantially step-like portion in its longitudinal cross section, namely, the recess 22 has a deep portion 22a and a shallow portion 22b. The fixing member 21 is positioned in the deep portion of the recess 22. An outlet of resin passage 11 is provided at the shallow portion, from which resin is injected into the cavity 33. On the other hand, a second outlet of resin passage 12 is provided at an inner wall portion of the second cavity 31 in the intermediate mold 6. Resin is injected in the second cavity 31 through the second outlet of resin passage 12 at the same time of the extrusion of resin through the outlet of resin passage 11.

Thus, the fixing member 21 is positioned in the deep portion of the recess 22; the plate-like material 1 is interposed between the intermediate mold 6 and the lower mold 7, and resin is injected into the cavities 33, 31 followed by solidifying. After the solidification of the resin, the intermediate mold 6 and the lower mold 7 are released. Portions of solidified resin at the outlets 11, 12 are removed by tearing, and the plate-like material 1 is taken out from the shaping mold. Thus, the plate-like material formed integrally with the frame and the seat having the fixing member can be obtained. In this embodiment, it is unnecessary to conduct post-finishing for the resin portions which have been left even by tearing.

Figure 3:
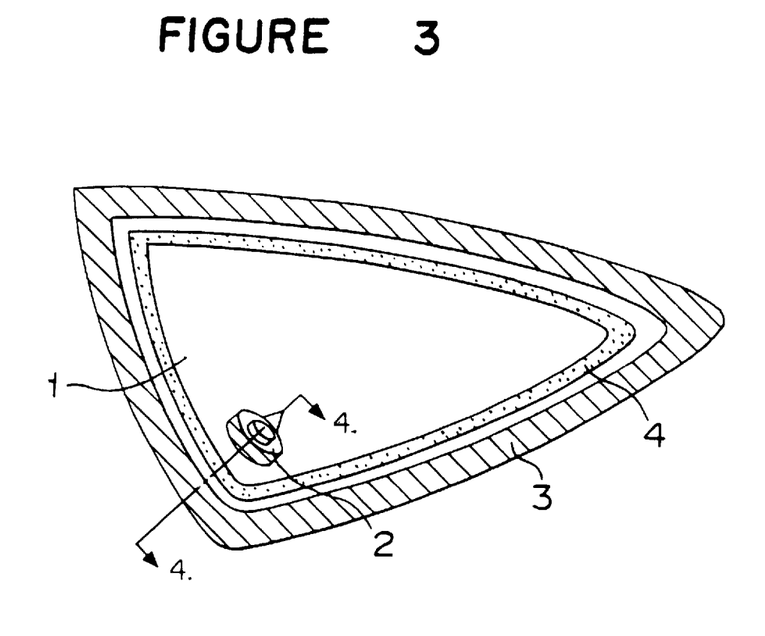
FIG. 3 is a perspective view schematically showing an embodiment of the plate-like material with a resinous member obtained by the method of the present invention.
Figure 4:
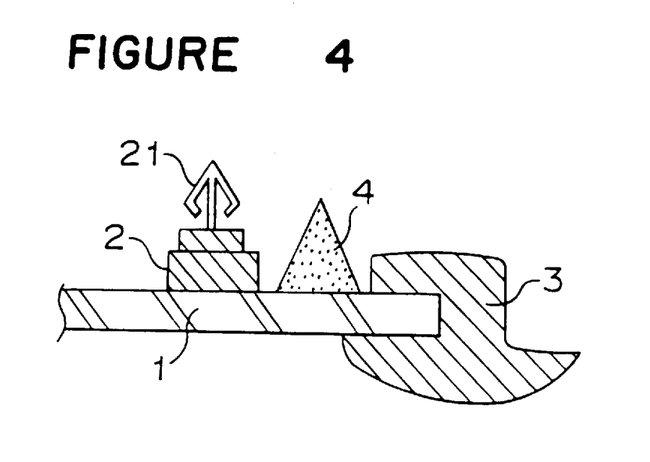
FIG. 4 is a cross-sectional view of a portion taken along a line A—A in FIG. 3.

FIG. 3 is a perspective view showing an embodiment of the plate-like material with the fixing member produced in accordance with the above, and FIG. 4 is a cross-sectional view taken along a line A—A in FIG. 3. A frame 3 of synthetic resin is formed integrally with a peripheral portion of the plate-like material 1. At the inner side of the frame 3, a seat 2 and a fixing member 21 firmly attached to the seat 2 are formed integrally with an interior side of the plate-like material 1.

In a case when the plate-like material with the fixing member is used as a fixed window for a vehicle, the fixing member 21 is inserted to a position-determining opening formed at a predetermined position in a flange of the vehicle, whereby the plate-like material 1 can be positioned correctly to the flange. In this case, a watertight sealant 4 is applied between the frame 3 of the plate-like material 1 and the seat 2 to which the fixing member is attached. Thus, the plate-like material with the fixing member is attached to the flange.

When the fixing member 21 itself has the function of to securing the plate-like material 1 to the flange (like a stud bolt), a butyl sealant or the like is used as the watertight sealant. On the other hand, when the fixing member 21 does not have a sufficient securing force, an urethane sealant or the like is used as the watertight sealant. In the later case, the fixing member 21 has the function of temporarily securing the plate-like material 1 to a predetermined position of the flange until the urethane sealant is solidified to permanently fix the plate-like material to the flange. As such a fixing member, a clip made of synthetic resin such as polyacetal or the like may be used although there is no limitation of it.

A generally used shaping mold made of metal can be used as the above-mentioned shaping mold. An inexpensive mold made of a high temperature resistant resin may also be used in consideration of lot and a pressure of injecting resin material. In the above-mentioned embodiments, the shaping mold comprises three mold portions. However, it may consist of two mold portions, and it can be used depending on requirements of the structure such as the sprue, the runner, the gate and so on.

In the embodiment shown in FIG. 2, the resin material in the same resin passage is branched and fed to separate portions for the seat and the frame. However, the resin material may be injected through separate resin passages in a case that the seat and the frame after molding have different hardness, physical properties and so on.

Although there is no special restriction in the shape of the outlets of the resin passage, it is preferable that the diameter of the resin passage outlets is 2 mm or less in order to cut the resin portion of the resin passage from the shaped product after the solidification of the resin material, and unnecessitate the post-finishing of the shaped surface.

FIGS. 5 through 7 show another embodiment of forming the seat on the plate-like material.

A shaping mold 50 has a mold portion having a recess 22 and a resin providing member 51. The shaping mold 50 is connected to a robot 60 at a portion of the resin providing member 51. The position where the robot supports the shaping mold 50 can be determined depending on the driving mechanism of the robot and a position where resin material is molded.

The robot can move the shaping mold 50 so that the recess 22 is brought to a predetermined position of the plate-like material 1. Then, the surface having the recess 22 is brought to contact with the plate-like material 1 at the position, whereby a cavity 53 is formed between the plate-like material 1 and the recess 22.

In the same manner as the embodiment shown in FIG. 1, the recess 22 has a substantially step-like shape in its longitudinal cross section, namely, it has the deep portion 22a and the shallow portion 22b. The outlet of resin passage 11 is formed at the shallow portion so that the resin material is injected into the cavity 53 through the outlet of resin passage 11 of the resin providing member 51. Further, the fixing member 21 is positioned in the deep portion 22a of the recess 22.

A back-up member 55 is preferably disposed on the surface of the plate-like material 1 at the opposite side of the shaping mold 50 so as to prevent the plate-like material from deflecting or breaking due to a pressure of the resin material injected.

Figure 8:
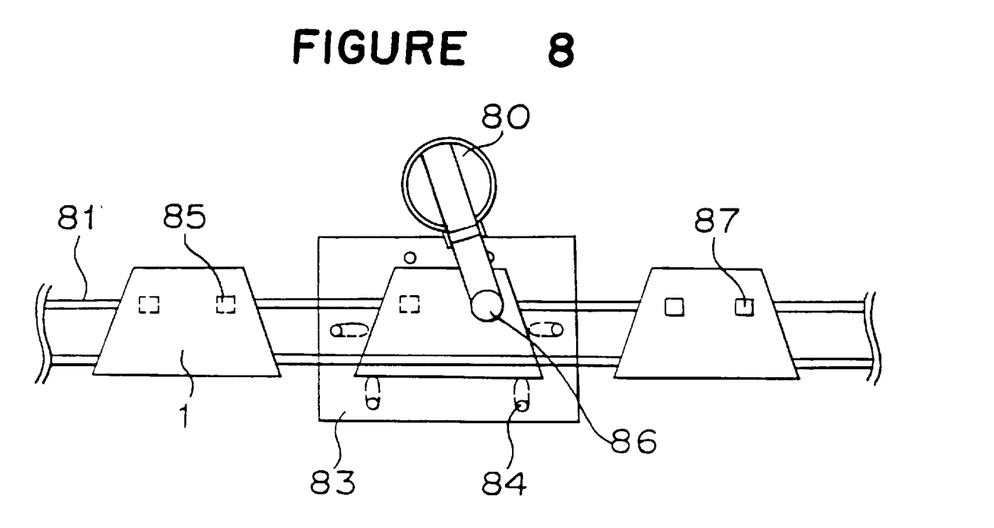
FIG. 8 is a plan view showing an embodiment of the method according to the present invention wherein a resin molding die is arranged at a predetermined position of a plate-like material.

FIG. 8 is a plane view showing a method of arranging the resin molding die at a predetermined position on the plate-like material in the above-mentioned embodiment.

First, the plate-like material, the shaping mold and the resin providing member are arranged at predetermined positions. The plate-like material 1 is transferred by a conveyor 81 which is driven at predetermined time intervals to a position-determining station 83 where a position-determining stopper, a pusher 84 and so on are operated, whereby the plate-like material 1 is placed at a predetermined correct position. In this case, a bonding material 85 such as an adhesive layer, a primer layer, a double-coating tape or the like may be provided in an area for forming the resinous member on the plate-like material 1.

When the determination of position of the plate-like material 1 is finished, the shaping mold and/or the resin providing member 86 is brought to a predetermined position by means of the robot 80. Instead of the stopper and/or the pusher 84, another fixing means such as a vacuum absorbing chuck may be used to fix the plate-like material 1.

When the fixing member is mounted on a resinous member 87 to be shaped before the shaping mold is set at a predetermined position, a desired element should be put in the mold in an element attaching station 88.

It is desirable that the lower surface of the mold is in close contact with the surface of the plate-like material. However, a gap is sometimes produced between the plate-like material and the lower surface of the die due to a slightly curved portion or unevenness in the surface of the plate-like material. Accordingly, it is preferable to provide a resilient member (not shown), which is durable to heat of molten resin, on the surface of the die in contact with the plate-like material, whereby there is no danger of producing a gap between the mold and the plate-like material. It is difficult in practice to obtain a complete contact between them due to a pressure of the resin extruded or injected and an amount of the resin. Accordingly, the production of fins at an edge or edges of the resinous member is unavoidable. In order to minimize the production of fins, a clearance of 0.3 mm or less should be formed in the contacting surface between the die and the plate-like material.

In this embodiment, the conveyor serves as the back-up member as shown in FIGS. 5–7.

The plate-like material is held in close contact between the shaping mold and the back-up member. Then, a screw 57 in the resin proving member 51 is rotated by driving a motor 51, and resinous material molten in a heat cylinder 58 is extruded or injected into the cavity 53 through the outlet of resin passage 11.

The extrusion or injection of the resinous material is automatically controlled by a computer operating in association with meters such an ammeter, a volt meter and so on provided for the motor 56. When the extrusion or injection of the resinous material has been completed and the temperature of the resin molding die has reduced to a predetermined temperature or less, the resin providing member is raised from the surface of the plate-like material 1, and a resinous member 70 is formed at a predetermined position of the plate-like material 1 as shown in FIG. 7.

The plate-like material with the resinous member 70 is removed from the position-determining station 83 by means of the conveyor 81, and the next plate-like material 1 is transferred to the position-determining station 83. The above-mentioned operation is repeated, as shown in FIG. 8.

As another way, only the mold portion may be held by the robot so as to be moved to a desired position, and the mold portion is connected to the resin providing member by means of a heat-resistant hose. With such an arrangement, the mold portion can be easily moved to a correct position smoothly.

Figure 9A:
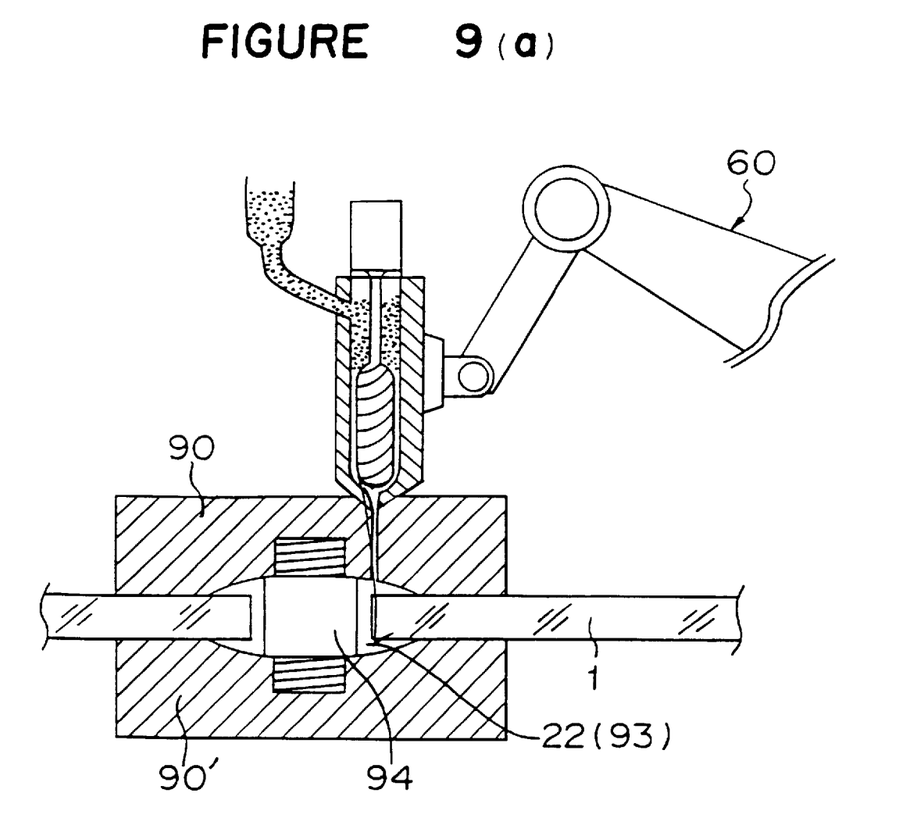
FIG. 9a is a schematic view in cross section showing another embodiment of the method of producing a plate-like material with a resinous member according to the present invention.
Figure 9B:
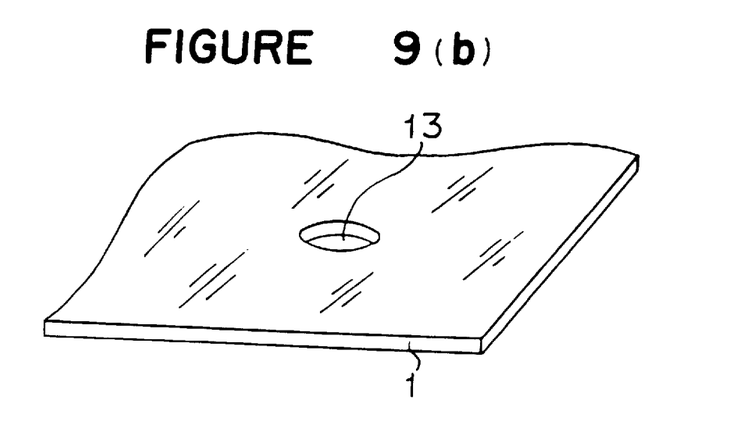
Figure 10:
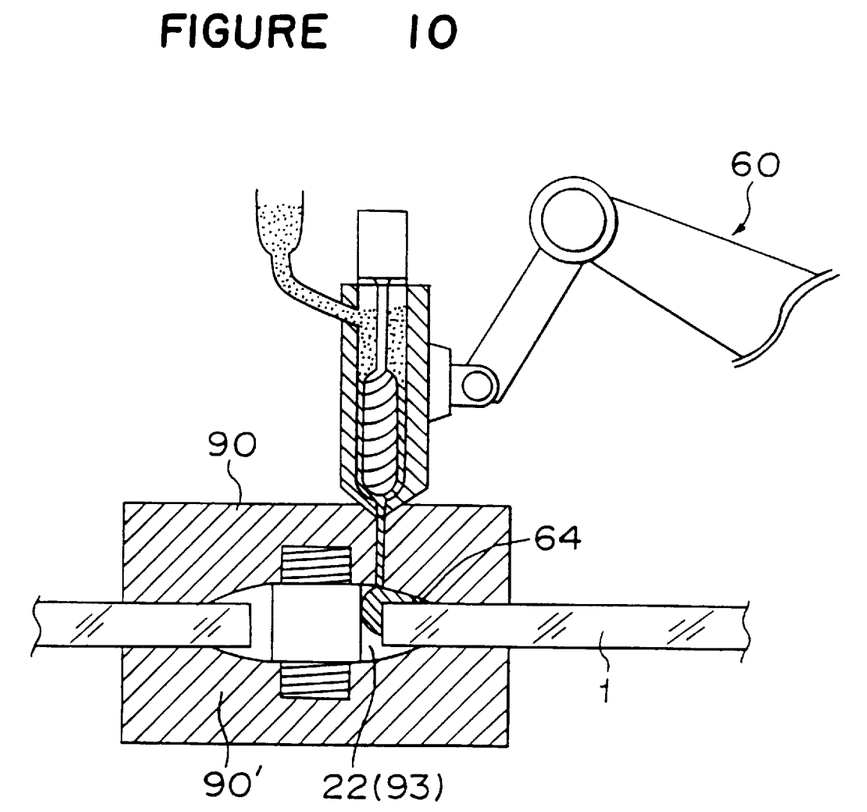
FIG. 10 is a schematic view in cross section showing another step in the method of producing the plate-like material with a resinous member according to the present invention.
Figure 11:
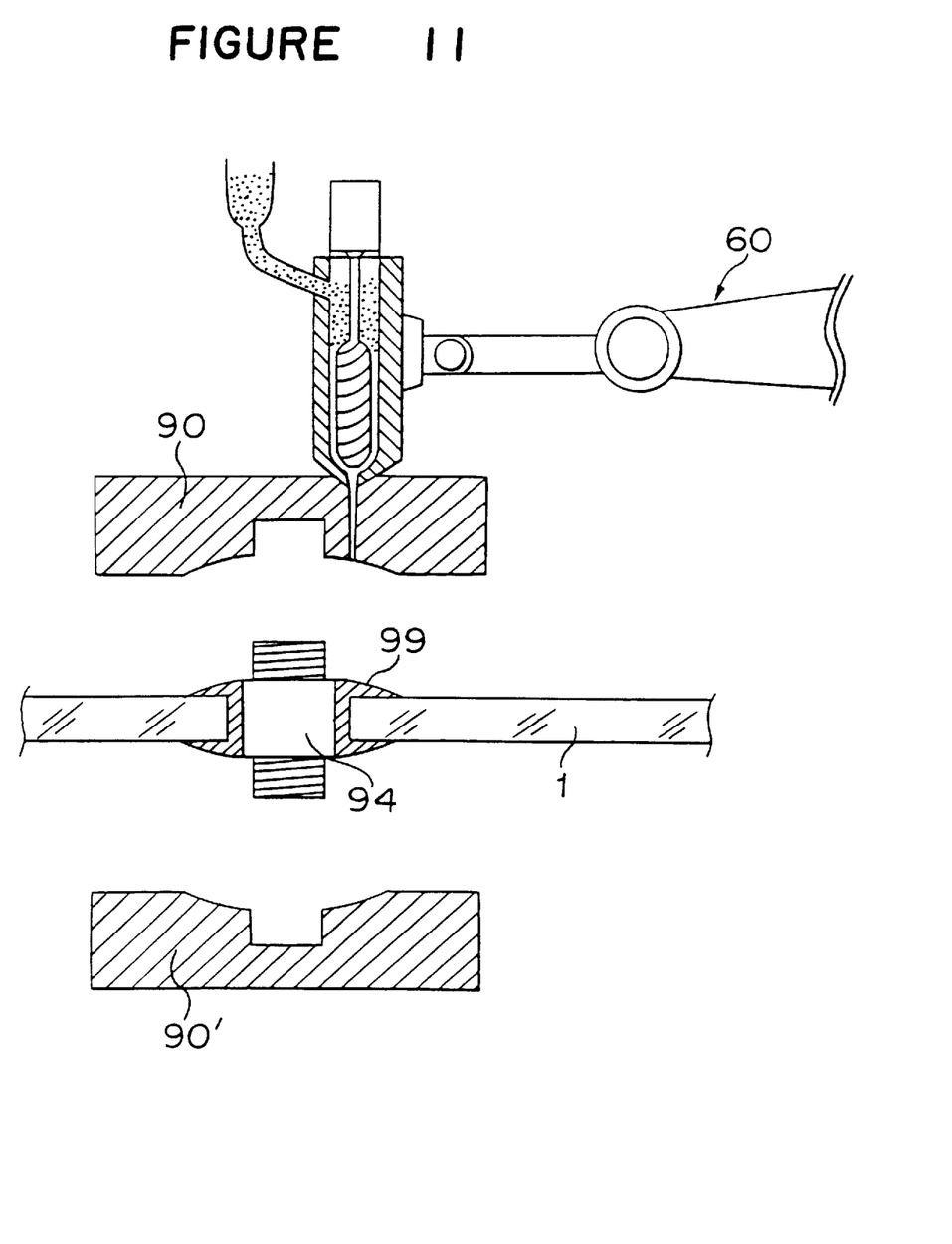
FIG. 11 is a schematic view in cross section showing another step in the method of producing the plate-like material with a resinous member according to the present invention.

Next, an embodiment of forming another member other than the seat, as the resinous member of the present invention, to the plate-like material will be described with reference to FIGS. 9 through 11.

Figure 12A:
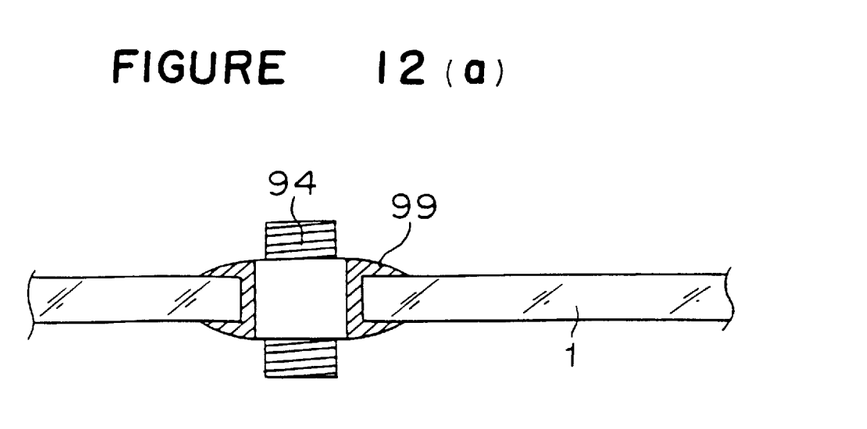
FIGS. 12a and 12b are respectively cross-sectional views in cross section showing different embodiments of the plate-like material according to the present invention.
Figure 12B:
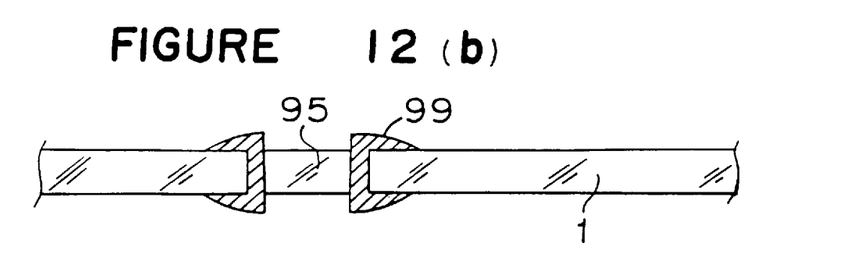
Figure 12C:
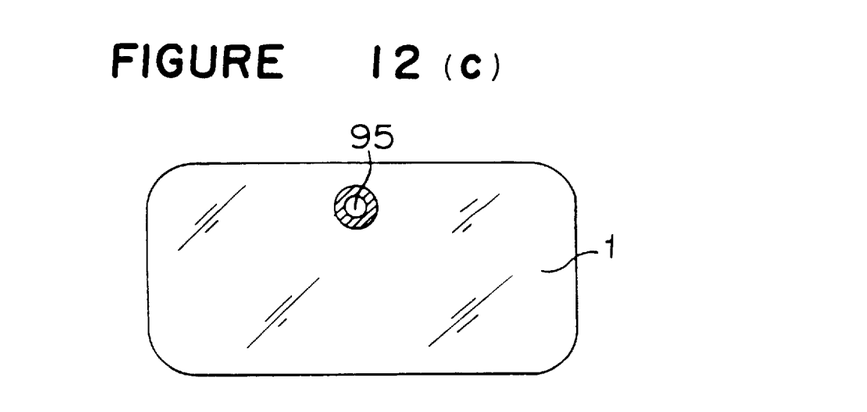
FIG. 12c is a plane view of the plate-like material shown in FIG. 12b.

The plate-like material 1 has an opening 13 in an area where the resinous member is formed. A shaping mold comprises a pair of upper and lower die portions 90, 90'. The plate-like material 1 is interposed between the pair of mold portions 90, 90' so as to include therein the opening 13, whereby a cavity 93 is formed in association with each recess 22 in the pair of mold portions 90, 90' and the plate-like material 1. Thus, the resinous member is formed in the cavity 93. In this embodiment, a suitable element 94 which functions as a fixing table for various devices such as wipers for an automobile may be provided in the cavity 93. FIG. 12 shows a resinous member 99 having the element 94 which traverses the surface of the plate-like material 1.

The element 94 may be so provided as to be withdrawn from the resinous member 99, whereby the resinous member 99 is formed only the peripheral portion of the opening of the plate-like material 1. In this case, the resinous member 99 performs as a packing for improving watertightness and holding performance in a case of attaching the wipers. Thus, the plate-like material having an opening 95 of a predetermined diameter around which is covered by resinous material can be formed.

As another embodiment of the resinous member, there is a seat for an internal mirror such as a back mirror, a room mirror or the like which is attached to a front glass or the like of a vehicle. The internal mirror is supported by a mirror base attached to the inner surface of the front glass. The mirror base is generally made of metal such as stainless steel. Accordingly, an adhesive agent is applied between the mirror base and the front glass. A layer of the adhesive agent should have a sufficient thickness to absorb vibrations when the vehicle is driven, whereby the dropping of the internal mirror can be prevented during the cruise.

The adhesive agent should have good performance such as a sufficient bonding strength between the mirror base and the front glass, easiness of bonding operation, and elasticity after bonding. In some cases, a requirement of making the bonding operation easy may reduce the other characteristics. With use of the method of the present invention to form the seat integrally with the mirror base at a predetermined position of the front glass, the operation can be easy. In this case, by injecting a selected resinous material capable of absorbing vibrations in the running of the vehicle into the cavity formed in association with the recess of the shaping mold and the front glass, the mirror base can be easily formed on the front glass without sacrificing the above-mentioned bonding characteristics, the easiness of bonding operation and the elasticity after bonding.

Further, the seat to be formed may have an engaging portion so as to facilitate the mechanically joining of it to the mirror base.

What is claimed is:

1. A method of forming a resinous member on a plate-shaped material for a window in one piece, the method comprising the steps of:

forming a recess at a side surface of a shaping mold;

placing a surface of the plate-shaped material in contact with the side surface of the shaping mold, so that the recess is located at an inner peripheral region of the plate-shaped material at a position which is spaced apart from an edge of the plate-shaped material, and the recess forms a cavity between the shaping mold and the plate-shaped material which is spaced from said edge of said plate-shaped material;

injecting or extruding a resinous material for forming the resinous member into the cavity; and curing the resinous material to form the resinous member, wherein the resinous material is formed in one piece on the plate-shaped material at said position spaced from the edge of the plate shaped material.

2. The method according to claim 1, comprising the further step of positioning a fixing member at a bottom of the recess to define a wall in the cavity by means of a bottom surface of the fixing member.

3. The method according to claim 2, wherein the bottom surface of the fixing member defines a flat surface.

4. The method according to claim 3, wherein an upper portion of the fixing member defines a triangular shape cross-section.

* * * * *

UNITED STATES PATENT AND TRADEMARK OFFICE
CERTIFICATE OF CORRECTION

PATENT NO. : 5,851,470

DATED : December 22, 1998

INVENTOR(S): Seiichi YOKOTA, et al.

It is certified that an error appears in the above-identified patent and that said Letters Patent is hereby corrected as shown below:

On the title page item [75], the 3rd inventor's name should be:

--Kazuhiro Takahashi--

Signed and Sealed this

Thirty-first Day of August, 1999

*Attest:*

Q. TODD DICKINSON

*Attesting Officer*     Acting Commissioner of Patents and Trademarks